United States Patent
Kim (10) Patent No.: US 10,425,016 B2
(45) Date of Patent: Sep. 24, 2019

(54) METHOD FOR CONTROLLING MEDIUM-VOLTAGE INVERTER AND SYSTEM COMPRISING THE SAME

(71) Applicant: LSIS CO., LTD., Anyang-si, Gyeonggi-do (KR)

(72) Inventor: Kyoung-Sue Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 27 days.

(21) Appl. No.: 15/866,021

(22) Filed: Jan. 9, 2018

(65) Prior Publication Data

US 2018/0316278 A1   Nov. 1, 2018

(30) Foreign Application Priority Data

Apr. 27, 2017   (KR) .................. 10-2017-0054619

(51) Int. Cl.
*H02M 7/49* (2007.01)
*H02P 1/54* (2006.01)
(Continued)

(52) U.S. Cl.
CPC ............. *H02M 7/49* (2013.01); *H02P 1/04* (2013.01); *H02P 1/426* (2013.01); *H02P 1/54* (2013.01);
(Continued)

(58) Field of Classification Search
CPC .. H02P 27/06; H02P 1/04; H02P 21/34; H02P 6/182; H02P 1/26; H02P 1/28; H02P 1/426; H02P 27/02; H02M 7/49
See application file for complete search history.

(56) References Cited

U.S. PATENT DOCUMENTS 5,440,219 A * 8/1995 Wilkerson ............... H02P 1/42
                                                      318/459
9,793,845 B2 * 10/2017 Lee .......................... H02P 21/34
(Continued)

FOREIGN PATENT DOCUMENTS

CN     103248294 A    8/2013
CN     103684120 A    3/2014
(Continued)

OTHER PUBLICATIONS

Japanese Office Action for related Japanese Application No. 2018-002807; action dated Sep. 11, 2018; (5 pages).
(Continued)

*Primary Examiner* — Thai T Dinh
(74) *Attorney, Agent, or Firm* — K&L Gates LLP (57) ABSTRACT

Disclosed herein are a method for controlling a medium-voltage inverter, and a system including the same. The system includes a motor, a medium-voltage inverter driving the motor, a control unit configured to control an output voltage from the medium-voltage inverter, and an output voltage measuring unit configured to measure counter electromotive force data of the motor including a voltage and a frequency of the counter electromotive force, and transmitting it to the control unit. The control unit generates the output voltage based on the measured counter electromotive force data to re-drive the motor when the output voltage measuring unit completes the measurement of the counter electromotive force data.

8 Claims, 7 Drawing Sheets

(51) Int. Cl.
*H02P 1/42* (2006.01)
*H02P 27/08* (2006.01)
*H02P 1/04* (2006.01)
*H02P 21/34* (2016.01)
*H02P 21/24* (2016.01)
*H02P 23/07* (2016.01)

(52) U.S. Cl.
CPC ............ *H02P 21/24* (2016.02); *H02P 21/34* (2016.02); *H02P 27/085* (2013.01); *H02P 23/07* (2016.02); *H02P 2207/01* (2013.01)

(56) References Cited

U.S. PATENT DOCUMENTS

| | | | |
|---|---|---|---|
| 2007/0120519 A1* | 5/2007 | Sakamoto | H02P 6/185 318/722 |
| 2013/0038259 A1 | 2/2013 | Andersen | |
| 2013/0175955 A1* | 7/2013 | Son | H02P 21/13 318/400.02 |
| 2013/0234640 A1* | 9/2013 | Bateman | H02P 6/26 318/400.35 |
| 2015/0061556 A1 | 3/2015 | Mullin | |
| 2015/0365016 A1* | 12/2015 | Ahn | H02M 7/5375 363/49 |
| 2017/0040914 A1* | 2/2017 | Floreancig | H02M 1/36 |
| 2017/0070173 A1* | 3/2017 | Lee | H02P 21/34 |

FOREIGN PATENT DOCUMENTS

| | | |
|---|---|---|
| EP | 2958227 A2 | 12/2015 |
| JP | S53109122 A | 9/1978 |
| JP | H06133584 A | 5/1994 |
| JP | H07337080 A | 12/1995 |
| JP | H10501057 A | 1/1998 |
| JP | 20051371069 A | 5/2005 |
| JP | 2005261052 A | 9/2005 |
| JP | 2007189889 A | 7/2007 |
| JP | 2008148415 A | 6/2008 |
| KR | 20160029914 A | 3/2016 |

OTHER PUBLICATIONS

European Search Report for related European Application No. 18150594.2; report dated Jun. 14, 2018; (9 pages).
Choi, et al.; "Restarting strategy for an induction machine driven with medium-voltage inverter"; Jun. 2015; 9th International Conference on Power Electronics—ECCE—Asia; (8 pages).
Hu, et al.; "Strategy for Restarting the Free-Running Induction Motor Driven by a High-Voltage Inverter Based on V/f Fuzzy Control"; 2016, 8th International Conference on Intelligent Human-Machine Systems and Cybernetics; (4 pages).

* cited by examiner

METHOD FOR CONTROLLING MEDIUM-VOLTAGE INVERTER AND SYSTEM COMPRISING THE SAME

CROSS-REFERENCE TO RELATED APPLICATIONS

Pursuant to 35 U.S.C. § 119(a), this application claims the benefit of earlier filing date and right of priority to Korean Patent Application No. 10-2017-0054619, filed on Apr. 27, 2017, entitled "Method for controlling medium voltage inverter and system comprising the same" in the Korean Intellectual Property Office, the disclosure of which is hereby incorporated by reference in its entirety.

BACKGROUND

1. Technical Field

The present disclosure relates to a method for controlling a medium-voltage inverter, and a system including the same.

2. Description of the Related Art

In a system for driving a medium-voltage induction machine (hereinafter referred to as a "motor") with a medium-voltage inverter (hereinafter referred to as an "inverter"), an overcurrent may be generated at the time of applying a voltage to the input of a motor for driving the motor.

Specifically, when a load connected to the rotation shaft of the motor rotates freely due to the inertia or an external force, an overcurrent occurs in the motor because the rate of change in the magnetic flux inside the motor does not match the frequency of the input voltage.

In order to prevent such overcurrent, inverters perform a function so-called "flying start." Previously, the flying start function has been carried out by decreasing the operating frequency from the maximum starting voltage frequency (60 Hz in the Republic of Korea) while applying the minimum voltage magnitude at the time of starting the motor to thereby detecting the direction of electric energy between the inverter and the motor.

Incidentally, a motor for industrial automation is generally not provided with a speed detection sensor except for a special purpose because an expensive facility change cost may occur when a speed detection sensor is installed. In addition, such a speed detection sensor may cause noise (high voltage circuit, vibration environment, etc.) that thus it is difficult to maintain the sensor. Accordingly, what is required is a method of detecting the rotation speed of a motor without any speed detection sensor.

Figure 1:
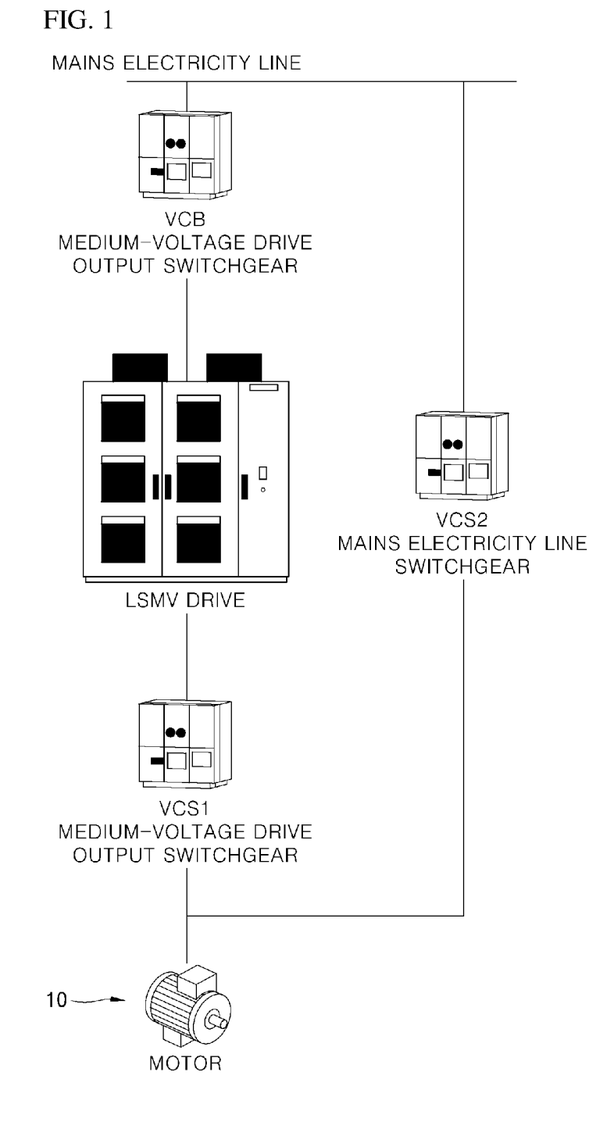
FIGS. 1 and 2 are diagrams for illustrating the flying start function of the existing system for controlling an inverter.
Figure 2:
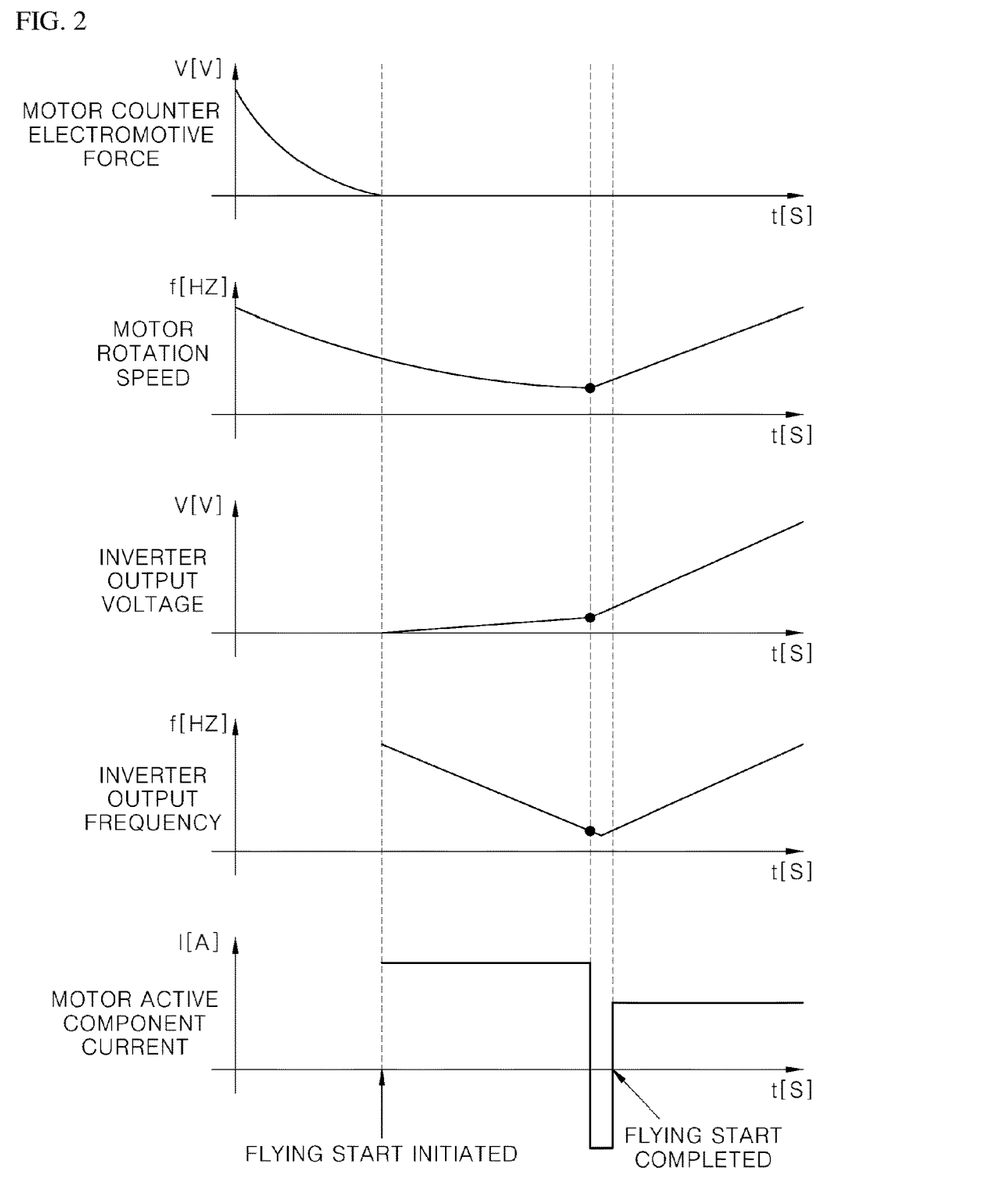

Referring now to FIGS. 1 and 2, an existing inverter control system and an existing flying start function are shown. It is to be noted that FIG. 1 shows the structure of an existing motor 10 having a medium-voltage inverter installed therein, in which a mains electricity line is connected to the motor 10 so that the motor 10 can be driven with the mains electricity even when the medium-voltage inverter fails.

Referring to FIG. 2, in the inverter control system of FIG. 1, when the motor 10 is free-rotating after the voltage supply to the motor 10 is interrupted, the rotational speed and the counter electromotive force of the motor 10 is decreased. When there is no counter electromotive force of the motor 10 (or the counter electromotive force is below a predetermined numerical value), a flying start function is performed.

At the start point of the flying start function, the output frequency of the inverter starts to decrease continuously from the maximum operating frequency (for example, 60 Hz), whereas the output voltage starts to increase from the minimum voltage.

At the end point of the flying start function, the output frequency becomes equal to the rotation speed of the motor 10, and the output voltage increases up to the voltage value equal to the ratio of the rated voltage to the rated frequency (hereinafter referred to as V/F ratio), and then the motor 10 is driven according to the V/F ratio.

According to the existing flying start function, the flow of electric energy between the medium-voltage inverter and the motor 10 is detected to detect the free rotation speed of the motor 10. When the output frequency of the medium-voltage inverter is faster than the rotation speed of the motor 10, the electric energy flows from inverter toward the motor 10, and the effective current of the motor 10 is detected in the positive direction.

On the contrary, when the output frequency becomes lower than the rotation speed of the motor 10, the electric energy flows from the motor 10 toward the inverter, and the effective current is detected in the negative direction.

The existing flying start function completes the speed detection when the detection of the effective current of the motor 10 is maintained in the negative direction for a predetermined time, and operates according to the V/F ratio.

The existing flying start is operable only when there is no counter electromotive force of the motor 10 (or only when it is below a predetermined numerical value). If the motor is operated without satisfying the condition, the motor effective current cannot be controlled, such that the flying start function fails.

If there is residual counter electromotive force in the motor 10, it is difficult to analyze the output current information of the motor 10 with the inverter, and thus the flying start function cannot be operated.

In addition, if the inverter circuit is operated to generate the inverter output voltage while there is a counter electromotive force, there is a risk that the counter electromotive force collides with the inverter output voltage and an overcurrent occurs.

SUMMARY

It is an object of the present disclosure to analyze a counter electromotive force information of a motor, detect the rotational speed of the motor using the analyzed information and re-drive the motor even when there is a counter electromotive force.

It is another object of the present disclosure to directly detect a counter electromotive force of a motor, that is, the magnitude and the frequency of the voltage of the counter electromotive force instead of detecting an effective current of the motor, thereby preventing an overcurrent from occurring due to a voltage collision.

It is another object of the present disclosure to perform the re-drive function by calculating or estimating the actual take-off speed of the motor in real time, so that the re-drive function can be performed without transient state despite any change in the take-off speed due to the load variations, and there is no need to measure a take-off curve.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a system includes a motor, a medium-voltage inverter driving the motor, a control unit configured to control an output voltage from the medium-voltage inverter, and an output voltage measuring unit configured to measure counter electromotive force data of the motor including a voltage and a frequency of the counter electromotive force, and transmitting it to the control unit. The control unit generates the output voltage based on the measured counter electromotive force data to re-drive the motor when the output voltage measuring unit completes the measurement of the counter electromotive force data.

The output voltage measuring unit may measures the back electromotive force data from the back electromotive force of the motor generated in the motor.

When the output voltage measuring unit completes the measurement of the counter electromotive force data, the control unit may generate the output voltage based on the measured counter electromotive force data to re-drive the motor, wherein the output voltage has a magnitude and a frequency equal to the voltage and the frequency, respectively, and is generated in the same phase as the counter electromotive force.

The output frequency may be maintained while the magnitude of the output voltage may increase until it reaches a predetermined ratio of an output voltage to an output frequency.

In accordance with another aspect of the present disclosure, a method for controlling a medium-voltage inverter includes: measuring, by an output voltage measuring unit electrically connected to the motor, counter electromotive force data of the motor including a voltage and a frequency of the counter electromotive force; re-driving, by the medium-voltage inverter, the motor based on the measured counter electromotive force data when the measurement of the counter electromotive force data is completed; and increasing the magnitude of the output voltage from the medium-voltage inverter.

The measuring the counter electromotive force of the motor may include measuring, by the output voltage measuring unit, the counter electromotive force data from the back electromotive force of the motor generated in the motor.

In the measuring the counter electromotive force of the motor, the output voltage may have a magnitude and a frequency equal to the voltage and the frequency, respectively, and may be generated in the same phase as the counter electromotive force.

The increasing the magnitude of the output voltage of the medium-voltage inverter may include increasing the magnitude of the output voltage until it reaches a predetermined ratio of an output voltage to an output frequency.

The increasing the magnitude of the output voltage of the medium-voltage inverter may include increasing the magnitude of the output voltage only while maintaining the output frequency of the medium-voltage inverter.

The increasing the magnitude of the output voltage of the medium-voltage inverter may include completing increasing the magnitude of the output voltage when it reaches a predetermined ratio of an output voltage to an output frequency As set forth above, according to an exemplary embodiment of the present disclosure, the system has the advantage in that by analyzing the counter electromotive force information of a motor and detecting the rotation speed of the motor using the analyzed information, it is possible to re-drive the motor even if there is a counter electromotive force, to thereby reduce the re-drive standby time.

In addition, the system can directly detect a counter electromotive force of a motor, that is, the magnitude and the frequency of the voltage of the counter electromotive force instead of detecting an effective current of the motor, with a simple configuration. In addition, the system can perform the re-drive function by calculating the actual take-off speed of the motor in real time, so that the re-drive function can be stably performed without transient state despite any change in the sliding speed due to the load variations.

In addition, the system can simplify the operation control algorithm between the system and the components by using the algorithm that receives the data of the output voltage measuring unit and controls the operation of the inverter.

The system can save the cost by detecting the rotation speed of the motor by a simple configuration without using a speed detection sensor. In addition, maintenance of the system becomes easier, and a variety of resources and cost necessary for managing the system can be saved.

In addition to the above-described effects, specific effects of the present disclosure will be described together with embodiments to be described below.

DETAILED DESCRIPTION

Advantages and features of the present disclosure and methods to achieve them will become apparent from the descriptions of exemplary embodiments hereinbelow with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, a method for controlling a medium-voltage inverter and a system including the same according to some exemplary embodiments of the present disclosure will be described in detail with reference to FIGS. 3 to 7.

Figure 3:
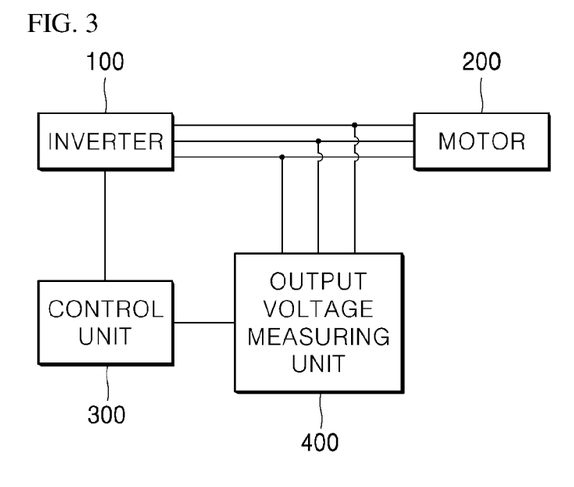
FIG. 3 is a block diagram for illustrating a system for controlling a medium-voltage inverter according to an exemplary embodiment of the present disclosure.

FIG. 3 is a block diagram for illustrating a system for controlling a medium-voltage inverter according to an exemplary embodiment of the present disclosure.

Referring to FIG. 3, the system may include an inverter 100, a motor 200, a control unit 300, and an output voltage measuring unit 400.

Although FIG. 3 depicts one inverter 100, one control unit 300, one output voltage measuring unit 400 and one motor 200, this is merely illustrative. The system may include more than one inverters, more than on control units, more than one output voltage measuring units, or more than one motors. When the system includes more than one inverters or motors, they may be connected either in parallel to the same node or in series with each other, for example.

The inverter 100 includes a device for converting DC power into AC power or vice versa. In addition, in order to control the speed of the motor 200, the inverter 100 may convert DC power or AC power to obtain AC power having a predetermined magnitude of voltage and frequency (e.g., 6.6 KV and 60 Hz). For example, the inverter 100 may include, but is not limited to, an inverter 100 of AC 600V or more (e.g., 6.6 KV or 3.3 KV).

In order to drive or re-drive the motor 200, the inverter 100 may output a voltage or a frequency corresponding to a predetermined magnitude or a predetermined ratio to control the rotation speed of the motor 200. For example, the inverter 100 may output a voltage or a frequency at a predetermined V/F ratio (for example, 6.6 KV/60 Hz).

The motor 200 includes an induction machine. For example, the motor 200 may include a single-phase induction machine or a three-phase induction machine. However, it is merely illustrative.

In addition, the inverter 100 may control the induction machine by controlling the frequency or slip.

The output voltage measuring unit 400 may include a circuit for measuring voltage that directly measures the counter electromotive force of the motor 200 generated in the motor 200 to detect the counter electromotive force data (for example, a voltage value representing the voltage magnitude of the counter electromotive force or a frequency value representing the frequency of the counter electromotive force). For example, the output voltage measuring unit 400 may include a non-isolated, voltage measuring circuit including a plurality of zener diodes and a plurality of resistors.

The output voltage measuring unit 400 may measure the counter electromotive force data of the motor 200 and may transmit the measured counter electromotive force data to the control unit 300. Specifically, the counter electromotive force data includes a voltage value of a counter electromotive force or a frequency value of a counter electromotive force, and the control unit 300 may control the output frequency and the output voltage of the inverter 100 based on the counter electromotive force data.

The output voltage measuring unit 400 may be included in the inverter 100 or may be disposed outside the inverter 100 and electrically connected to it. However, it is merely illustrative.

The control unit 300 may include a module, an electric circuit, or a device for controlling the output frequency and the output voltage of the inverter 100. However, it is merely illustrative.

The control unit 300 may control the inverter 100 using variable voltage variable frequency (VVVF) drive in which the frequency is varied and the voltage is also changed in proportion thereto.

In addition, the control unit 300 may also control the inverter 100 by pulse width modulation (PWM) or by pulse amplitude modulation (PAM), by which the output time of the pulse voltage is changed without changing the magnitude of the smoothed voltage to change the equivalent voltage. However, it is merely illustrative.

In the system for controlling a medium-voltage inverter, when the voltage supply is interrupted and the motor 200 rotates freely, the output voltage measuring unit 400 may measure the counter electromotive force of the motor 200. In addition, the system analyzes the counter electromotive force data measured by the control unit 300 and controls the motor 200 using the inverter output voltage and frequency having the voltage and frequency of the counter electromotive force. At this time, the system may detect the rotation speed of the motor 200 and perform the flying start function for re-driving the motor 200.

The control unit 300 can calculate the actual rotation speed (i.e., rotation frequency) of the motor 200 based on the counter electromotive force of the motor 200 at the time of re-driving even if there is a counter electromotive force in the induction machine (e.g., even if it is above the predetermined reference value). In addition, the control unit 300 analyzes the voltage, the frequency, and the phase angle of the counter electromotive force to perform the flying start function. However, it is merely illustrative.

The output voltage measuring unit 400 may use voltage detecting function to detect the speed of the motor 200 in a period where the counter electromotive force remains. For example, the voltage detection function refers to a sensing function that performs sampling at the rate of 1 ms using a voltage-dividing resistor to produce a digital signal.

The counter electromotive force may be analyzed by measuring the counter electromotive force of the motor via phase voltage sensing to calculate the reference phase and the maximum value using the three-phase phase locked loop (PLL) function.

In addition, the control unit 300 may generate the waveform of the output voltage having the same magnitude, phase and frequency as the counter electromotive force generated in the motor 200 based on the result of the counter electromotive force analysis.

In addition, the control unit 300 generates the same voltage as the counter electromotive force of the motor in the inverter 100 at the start of the flying start function using the output voltage waveform having the same magnitude, phase and frequency as the counter electromotive force.

For example, the output voltage measuring unit 400 may detect the three-phase counter electromotive force of the motor 200 by a transformer, and may convert the detected three-phase counter electromotive force into a two-phase counter electromotive force by a converter.

Also, the output voltage measuring unit 400 may calculate the angular velocity of the converted two-phase counter electromotive force by using a proportional integral controller (PI) that sets the q-axis counter electromotive force of the two-phase counter electromotive force to 0.

In addition, the output voltage measuring unit 400 may calculate the phase angle of the counter electromotive force by integrating the calculated angular velocity by an integrator.

Also, the output voltage measuring unit 400 may calculate the magnitude of the counter electromotive force by squaring each value of the q-axis counter electromotive force and the d-axis counter electromotive force of the two-phase counter electromotive force, adding them, and finding the square root of the sum. However, it is merely illustrative.

Figure 4:
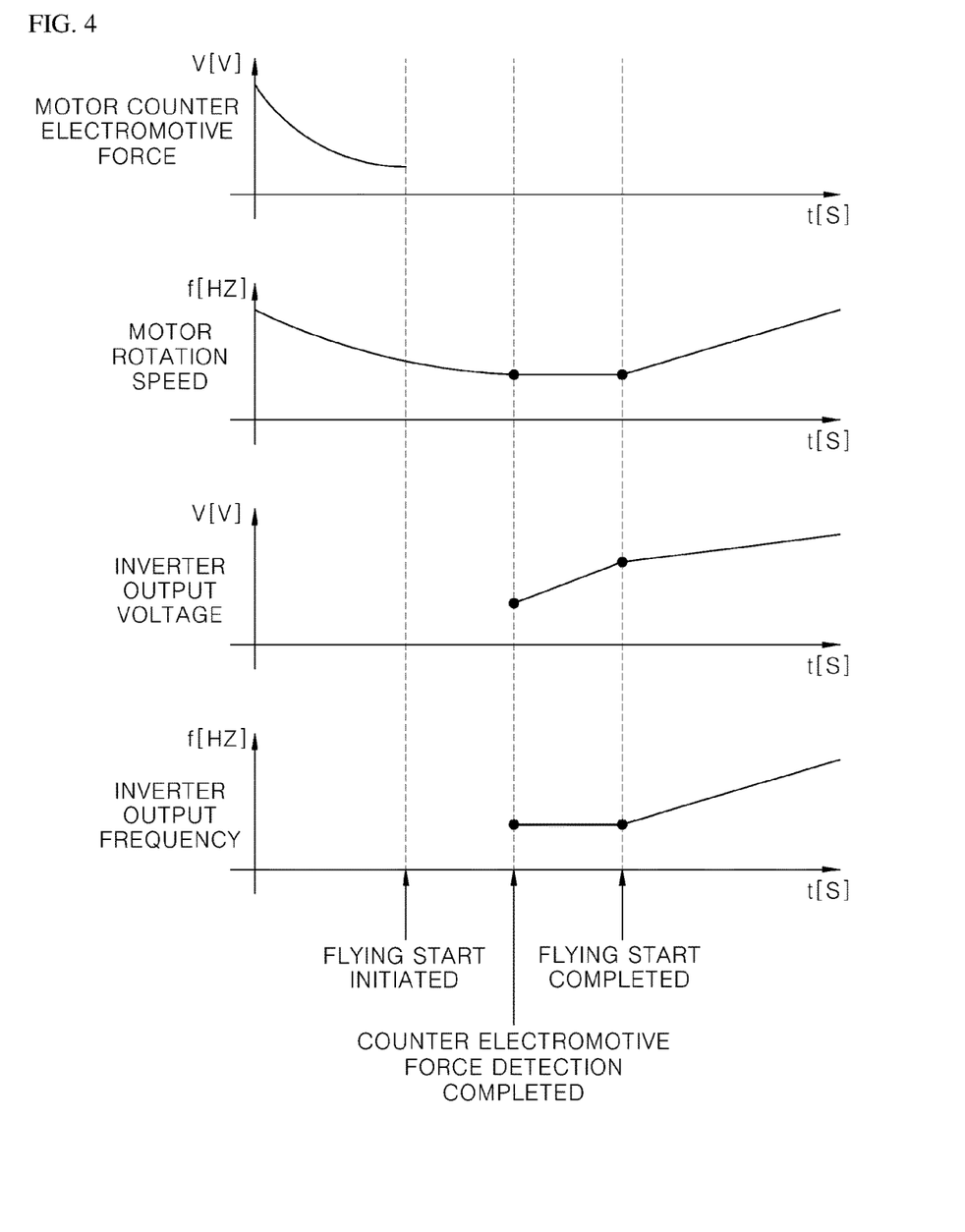
FIG. 4 is a diagram for illustrating the flying start function of the system of FIG. 3.

FIG. 4 is a diagram for illustrating the flying start function of the system of FIG. 3. In the following descriptions, descriptions will be made focusing on differences from the above exemplary embodiment, and the redundant description will be omitted.

Referring to FIG. 4, in the system according to an exemplary embodiment of the present disclosure, when the motor 200 is rotating freely after the voltage supply of the motor 200 is interrupted, the rotation speed and the magnitude of the counter electromotive force of the motor 200 decreases, and the flying start function can be performed even when there is a counter electromotive force in the motor 200 (or it is above the predetermined reference value).

At the start point of the fly start function, the output voltage measuring unit 400 may measure the counter electromotive force of the motor 200 from the counter electromotive force generated in the motor 200 and transmit the measured counter electromotive force data (voltage value, frequency value or phase value of the counter electromotive force) to the control unit 300. At this time, the control unit 300 analyzes the counter electromotive force, and transmits the output voltage waveform having the same voltage magnitude, phase and frequency as the counter electromotive force generated in the motor 200 to the inverter 100.

Once the counter electromotive force is detected, the inverter 100 receives the output voltage waveform having the same voltage magnitude, phase and frequency as the counter electromotive force from the control unit 300 and outputs the same output voltage waveform as the output voltage waveform to re-drive the motor 200.

After the inverter 100 outputs the output voltage waveform having the same voltage magnitude, phase and frequency as the counter electromotive force, an intermediate stage begins, in which the output frequency of the inverter 100 is fixed (kept the same) while the output voltage is increased.

The intermediate stage refers to a period from the completion of the detection of the counter electromotive force to the completion of the flying start function. However, it is merely illustrative.

In the intermediate stage, the inverter output voltage increases until the magnitude of the inverter output voltage reaches a predetermined V/F ratio, and then the intermediate stage ends and the flying start function is completed. For example, the predetermined V/F ratio may be the ratio of 6.6 KV/60 Hz.

From the completion of the flying start function, the inverter 100 may drive the motor 200 at the predetermined V/F ratio. However, it is merely illustrative.

Figure 5:
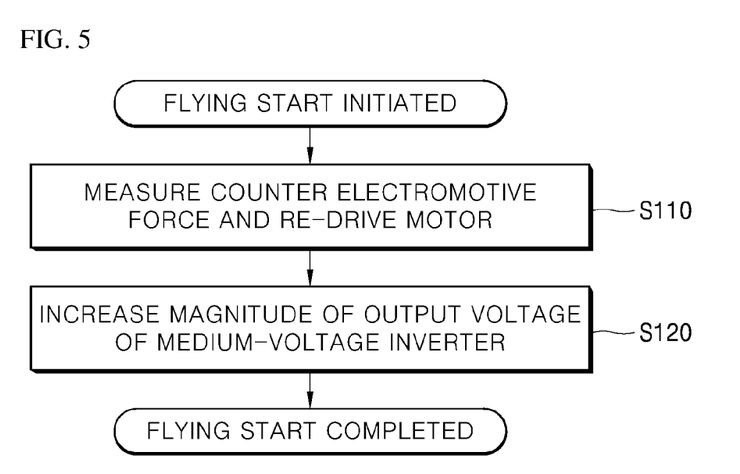
FIG. 5 is a flow chart for illustrating a method for controlling a medium-voltage inverter according to some exemplary embodiments of the present disclosure.

FIG. 5 is a flow chart for illustrating a method for controlling a medium-voltage inverter according to some exemplary embodiments of the present disclosure. In the following descriptions, descriptions will be made focusing on differences from the above exemplary embodiment, and the redundant description will be omitted.

Referring to FIG. 5, the flying start function of the method starts with measuring the counter electromotive force of the motor 200 to re-drive the motor 200 (step S110). Specifically, the counter electromotive force data of the motor 200 is measured by the output voltage measuring unit 400 electrically connected to the motor 200 driven by the inverter 100. At this time, the output voltage measuring unit 400 may transmit the measured counter electromotive force data to the control unit 300, such that the inverter 100 may re-drive the motor 200. For example, the counter electromotive force data may include a voltage value of the counter electromotive force, a frequency value of the counter electromotive force, and a phase value of the counter electromotive force. However, it is merely illustrative.

Subsequently, the magnitude of the output voltage from the inverter 100 increases (step S120). Specifically, the control unit 300 increases the magnitude of the output voltage from the inverter 100 based on the counter electromotive force data measured by the output voltage measuring unit 400. The output voltage from the inverter 100 may increase to reach the V/F ratio by the VVVF drive. For example, when the motor 200 is driven with the frequency of 30 Hz, the output voltage may increase to reach 3.3 KV, for example.

Figure 6:
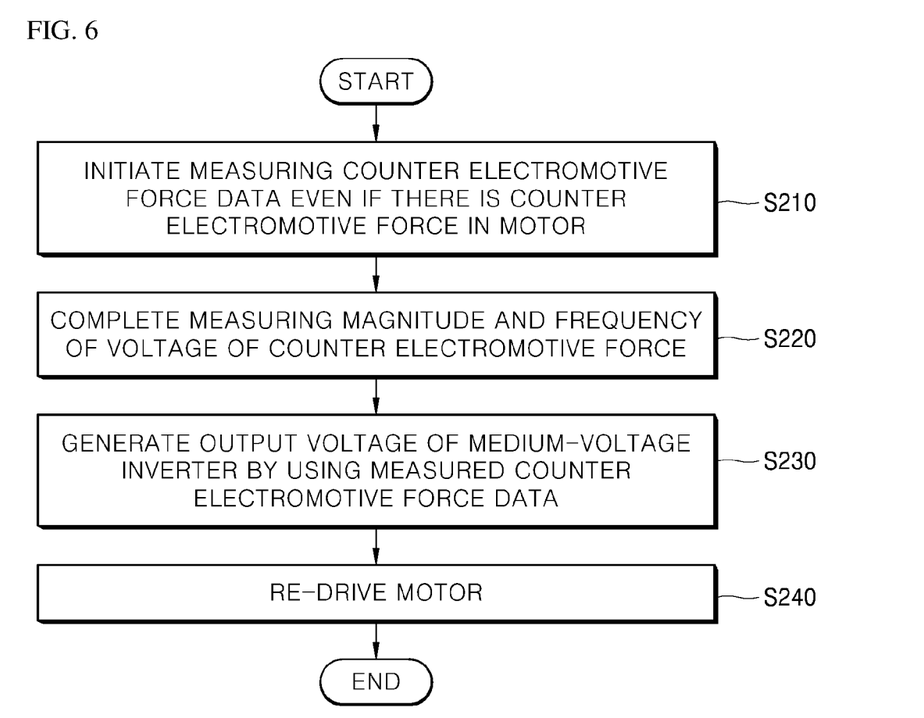
FIG. 6 is a flow chart for illustrating a method for controlling a medium-voltage inverter according to an exemplary embodiment of the present disclosure.

FIG. 6 is a flow chart for illustrating a method for controlling a medium-voltage inverter according to an exemplary embodiment of the present disclosure. In the following descriptions, descriptions will be made focusing on differences from the above exemplary embodiment, and the redundant description will be omitted.

Referring to FIG. 6, the output voltage measuring unit 400 starts measuring the counter electromotive force data even when there is a counter electromotive force of the motor 200 (step S210). Specifically, the output voltage measuring unit 400 can overcome the shortcoming in the related art that it was not possible to measure the active component of the current of the motor 200 by operating the inverter circuit in order to detect the speed of the motor 200 when there is residual counter electromotive force (or when the counter electromotive force is below a predetermined value).

In addition, the output voltage measuring unit 400 may directly measure the counter electromotive force of the motor 200 generated in the motor 200 to thereby reduce the re-drive standby time.

Subsequently, the measurement of the voltage and frequency of the counter electromotive force voltage is completed (step S220). Specifically, the output voltage measuring unit 400 measures counter electromotive force data from the counter electromotive force of the motor 200 generated in the motor 200. For example, the counter electromotive force data may include a voltage of the counter electromotive force, a frequency of the counter electromotive force, and a phase of the counter electromotive force.

Subsequently, the control unit 300 generates the output voltage of the inverter 100 using the measured counter electromotive force data, and re-drives the motor 200 (steps S230 and S240). Specifically, when the measurement of the counter electromotive force data is completed in the output voltage measuring unit 400, the control unit 300 receives the measured counter electromotive force data from the output voltage measuring unit 400, analyzes the counter electromotive force data, and transmits the output voltage or the output voltage waveform value to the inverter (100).

At this time, the inverter 100 receives the output voltage or the output voltage waveform value from the control unit 300 and re-drives the motor 200. For example, the output voltage or the output voltage waveform value may have the same voltage and frequency as the counter electromotive force. In addition, the output voltage or the output voltage waveform value may be generated in the same phase as the counter electromotive force.

Figure 7:
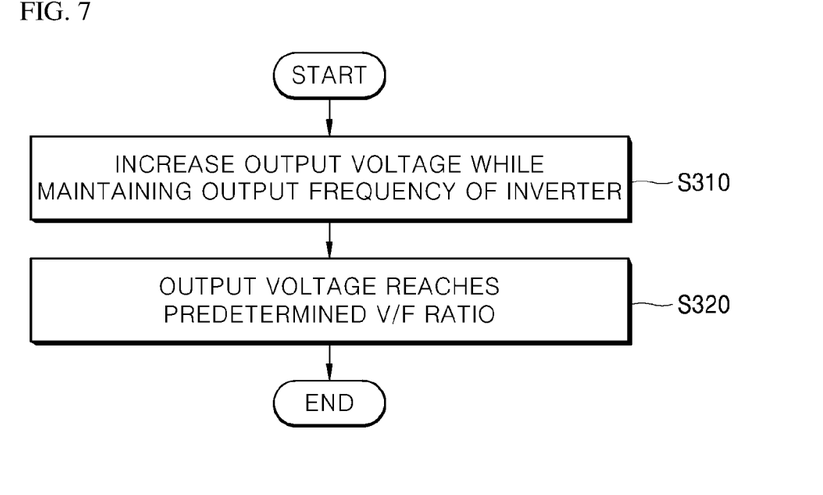
FIG. 7 is a flow chart for illustrating a method for controlling a medium-voltage inverter according to another exemplary embodiment of the present disclosure.

FIG. 7 is a flow chart for illustrating a method for controlling a medium-voltage inverter according to another exemplary embodiment of the present disclosure. In the following descriptions, descriptions will be made focusing on differences from the above exemplary embodiment, and the redundant description will be omitted.

Referring to FIG. 7, the control unit 300 increases the output voltage while maintaining the output frequency of the inverter 100 (step S310). Specifically, when the measurement of the counter electromotive force data is completed in the output voltage measuring unit 400, the control unit 300 may generate the output voltage using the measured counter electromotive force data to re-drive the motor 200. The generated output voltage may have the same magnitude, phase and frequency of the measured counter electromotive force voltage.

For example, the control unit 300 may increase the magnitude of the output voltage until it reaches a predetermined ratio of the output voltage to the output frequency (e.g., the V/F ratio) while maintaining the output frequency.

Subsequently, the magnitude of the output voltage reaches a predetermined V/F ratio (step S320). Specifically, the control unit 300 maintains the frequency of the output voltage of the inverter 100 and increases the magnitude of the output voltage until it reaches the predetermined ratio of the output voltage to the output frequency, such that the flying start function is completed. For example, the control unit 300 may drive the motor 200 so that the V/F ratio is maintained (e.g., 6.6 KV/60 Hz). For 30 Hz frequency drive, the calculated output voltage may be 3.3 KV, and the output voltage from the inverter may be 3.3 KV.

The system for controlling a medium-voltage inverter according to the above-described exemplary embodiments of the present disclosure has the advantage in that by analyzing the counter electromotive force information of a motor and detecting the rotation speed of the motor using the analyzed information, it is possible to re-drive the motor even if there is a counter electromotive force, to thereby reduce the re-drive standby time.

In addition, the system can directly detect a counter electromotive force of a motor, that is, the magnitude and the frequency of the voltage of the counter electromotive force instead of detecting an effective current of the motor, with a simple configuration.

In addition, the system can perform the re-drive function by calculating the actual take-off speed of the motor in real time, so that the re-drive function can be stably performed without transient state despite any change in the take-off speed due to the load variations.

In addition, the system can simplify the operation control algorithm between the system and the components by using the algorithm that receives the data of the output voltage measuring unit and controls the operation of the inverter.

Further, the system can save the cost by detecting the rotation speed of the motor by a simple configuration without using a speed detection sensor.

Although the method and the system of the present disclosure have been described with reference to exemplary embodiments thereof, the present disclosure is not limited thereby. Some or all of the exemplary embodiments may be selectively combined so that changes, modifications, enhancements and/or refinements may be made to the above-described exemplary embodiments of the present disclosures.

Although the exemplary embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are not limiting but illustrative in all aspects.

What is claimed is:

1. A system for controlling a medium-voltage inverter, wherein the system comprises:
a motor;
a medium-voltage inverter driving the motor;
a control unit configured to control an output voltage from the medium-voltage inverter; and
an output voltage measuring unit configured to measure counter electromotive force data of the motor comprising a voltage and a frequency of the counter electromotive force, and transmitting the counter electromotive force data to the control unit,
wherein the control unit generates the output voltage based on the measured counter electromotive force data to re-drive the motor when the output voltage measuring unit completes the measurement of the counter electromotive force data,
wherein when the output voltage measuring unit completes the measurement of the counter electromotive force data, the control unit generates the output voltage based on the measured counter electromotive force data to re-drive the motor, and
wherein the output voltage has a magnitude and a frequency equal to the voltage and the frequency, respectively, and is generated in the same phase as the counter electromotive force.

2. The system of claim 1, wherein the output voltage measuring unit measures the counter electromotive force data from the counter electromotive force of the motor generated in the motor.

3. The system of claim 1, wherein the output frequency is maintained while the magnitude of the output voltage increases until it reaches a predetermined ratio of an output voltage to an output frequency.

4. A method for controlling a medium-voltage inverter performed in a system comprising a motor and a medium-voltage inverter driving the motor, the method comprising:
measuring, by an output voltage measuring unit electrically connected to the motor, counter electromotive force data of the motor comprising a voltage and a frequency of the counter electromotive force;
re-driving, by the medium-voltage inverter, the motor based on the measured counter electromotive force data when the measurement of the counter electromotive force data is completed; and
increasing the magnitude of the output voltage from the medium-voltage inverter,
wherein in the measuring the counter electromotive force of the motor, the output voltage has a magnitude and a frequency equal to the voltage and the frequency, respectively, and is generated in the same phase as the counter electromotive force.

5. The method of claim 4, wherein the measuring the counter electromotive force of the motor comprises
measuring, by the output voltage measuring unit, the counter electromotive force data from the counter electromotive force of the motor generated in the motor.

6. The method of claim 4, wherein the increasing the magnitude of the output voltage of the medium-voltage inverter comprises increasing the magnitude of the output voltage until it reaches a predetermined ratio of an output voltage to an output frequency.

7. The method of claim 4, wherein the increasing the magnitude of the output voltage of the medium-voltage inverter comprises increasing the magnitude of the output voltage only while maintaining the output frequency of the medium-voltage inverter.

8. The method of claim 4, wherein the increasing the magnitude of the output voltage of the medium-voltage inverter comprises completing increasing the magnitude of the output voltage when it reaches a predetermined ratio of an output voltage to an output frequency.

\* \* \* \* \*